United States Patent [19]
Hayakawa

[11] Patent Number: 5,365,030
[45] Date of Patent: Nov. 15, 1994

[54] COREPIECE HANDLING DEVICE AND METHOD

[75] Inventor: Jyun Hayakawa, Yokohama, Japan

[73] Assignee: Sodick Co., Ltd., Yokohama, Japan

[21] Appl. No.: 916,115

[22] PCT Filed: Nov. 30, 1991

[86] PCT No.: PCT/JP91/01678
§ 371 Date: Sep. 17, 1992
§ 102(e) Date: Sep. 17, 1992

[87] PCT Pub. No.: WO92/09396
PCT Pub. Date: Jun. 11, 1992

[30] Foreign Application Priority Data
Nov. 30, 1990 [JP] Japan .................. 2-337763

[51] Int. Cl.⁵ .................................. B23H 7/02
[52] U.S. Cl. .......................... 219/69.12; 269/8
[58] Field of Search .............. 219/69.12, 69.17; 269/8, 9, 21

[56] References Cited

U.S. PATENT DOCUMENTS

| | | | |
|---|---|---|---|
| 4,484,052 | 11/1984 | Inoue | 219/69.17 |
| 5,015,814 | 5/1991 | Morishita | 219/69.12 |
| 5,057,663 | 10/1991 | Kinoshita | 219/69.12 |
| 5,177,334 | 1/1993 | Magara et al. | 219/69.12 |
| 5,183,986 | 2/1993 | Magara et al. | 219/69.12 |

FOREIGN PATENT DOCUMENTS

| | | | |
|---|---|---|---|
| 0432350 | 6/1991 | European Pat. Off. | |
| 0480369 | 4/1992 | European Pat. Off. | |
| 61-86132 | 5/1986 | Japan | 219/69.12 |
| 61-109617 | 5/1986 | Japan | |
| 63-22220 | 1/1988 | Japan | |
| 63-185531 | 8/1988 | Japan | 219/69.12 |
| 2-279216 | 11/1990 | Japan | 219/69.12 |

*Primary Examiner*—Geoffrey S. Evans
*Attorney, Agent, or Firm*—Marks & Murase

[57] ABSTRACT

When performing contour machining of a workpiece by the wire cut electro-discharge method, a first holding elements, formed of an electromagnet, etc., for maintaining a corepiece, is fixed to a second holding elements which is fixed to an upper wire guide block, so that the first holding elements can be freely loaded and removed from the second holding elements. Therefore, before the corepiece is completely cut out, the corepiece can be held and maintained by arranging the corepiece and the rest of the work piece, so that they are straddled by the first holding elements. Then, after the corepiece is cut out, the first holding elements is held by the second holding elements, the core can be drawn out of the workpiece by raising and moving the second holding elements, and can then be transferred to a prescribed position. The corepiece handling operation can be rapidly, stably, and automatically performed using a simple device.

15 Claims, 12 Drawing Sheets

COREPIECE HANDLING DEVICE AND METHOD

FIELD OF THE INVENTION

This invention relates to a core handling device and to method for performing wire cut electro-erosion machining wherein the core cut-out piece is maintained at a constant position during machining and is thereafter automatically removed from the workpiece.

BACKGROUND

When performing contour machining, etc., by wire cut electric discharge machining methods, after forming a start hole in the workpiece, the wire electrode is passed through the start hole, to thereby create a machining gap between the wire electrode and the workpiece. Electric discharges are produced across the machining gap by intermittently applying a voltage between the wire electrode and workpiece and a numerical controller or the like is used to import a relative movement between the wire electrode and the workpiece, whereby the desired contour is machined.

When machining by the wire cut electric discharge method, as the machining approaches the finishing point, the core cut out by the machining may vibrate and be displaced resulting in a short circuit between the wire electrode and workpiece, thus interrupting machining.

In order to prevent such short circuiting, before completion of wire cut machining, it is necessary to maintain the corepiece in an immobile state relative to the workpiece. However, when so maintaining the core, the position of the wire guide which guides the wire electrode may be displaced, especially in the case of taper cut machining, thereby adversely influencing machining precision. Therefore, when fixing the corepiece position, it is desirable to have the corepiece immobilizing device within the guide block which contains the wire guide.

Also, for the purpose of performing unmanned machining over long time periods, after completion of the first wire cut machining, it is desirable that after the corepiece is removed from the workpiece, the machine be able to perform a second cut. Also, when machining several products from one workpiece, it is desirable, after cutting the corepiece out of the workpiece, and transferring it to a prescribed position, to automatically restart machining to machine the next contour.

Several corepiece handling devices have been suggested to maintain the corepiece against the workpiece, or to transfer it to a prescribed position after it is cut out from the workpiece. For example, Jpn. A 61-109617 discloses that after fixing a ring-shape electromagnet around a nozzle device, the electromagnet may be excited, thereby attaching any corepiece composed of a magnetic material to the electromagnet. When the excitation is cut off, the corepiece will become detached from the electromagnet.

However, many different sizes of corepieces may be cut out by wire cut electroerosion machining and each requires an appropriately sized holding device. When an electromagnet holder of the type which is screwed onto the periphery of the guide block having the flushing nozzle thereon, is used to support a ring-shape electromagnet, which magnetically attracts the corepiece via a ball bearing, the electromagnet or the electromagnet holder should be replaced according to the size of the corepiece to be handled. Such replacement work is complicated. Also, the need to change the corepiece handling devices causes a decrease in the overall machining efficiency, and renders automatic operation impossible.

Also, in Jpn. A, 62-38095, there is disclosed a structure that attracts and fixes both the cutout part and the non-cutout part of the workpiece. The structure comprises several permanent magnets installed in a substrate which can be freely attached and removed from the tip of the machining head. Removal is accomplished by exciting an arbitrary, desired permanent magnet using a coil controlled by a controller. However, in this composition, the structure used for maintaining the corepiece fixed to the machining head is undesirably large.

SUMMARY OF THE INVENTION

It is an object of the invention to provide a simple corepiece handling device and method capable of easily handling corepieces of varying sizes. It is a further object of the invention to provide an improved corepiece handling method and apparatus for improving the efficiency of operation and for permitting automatic operation.

It is yet another object of the invention to provide a corepiece handling device which can maintain the position of the corepiece relative to the workpiece and which does not displace or require repositioning of this wire guide.

Another object of the invention is to provide a method and apparatus that maintains the corepiece position relative to the workpiece during machining and is capable of removing the corepiece from the workpiece and transferring it to a prescribed location.

To achieve the foregoing and other objects and in accordance with the purpose of the present invention, there is provided a wire cut electro-discharge machining device and method for machining a workpiece by applying a machining voltage across the machine gap formed between the wire electrode and the workpiece. The corepiece handling device and method are characterized by a first hollow holding means formed from a magnetizing element, selected portions of which can be magnetized and demagnetized, and a second hollow holding means which is fixed to the wire guide block for detachably holding the first holding means.

Therefore, the first holding means may be removed from the second holding means and arranged so to straddle the corepiece and the surrounding workpiece whereby the corepiece is maintained vis-a-vis the rest of the workpiece via the first holding means. When machining progresses in this state, even though the corepiece may be completely cut away from the rest of the workpiece, its position relative to the rest of the workpiece is maintained.

The handling of the corepiece is accomplished in accordance with the size and shape of the corepiece. For example, if the size of the corepiece is relatively small, after attaching the first holding means to the second holding means, i.e., by raising and moving the second holding means, the corepiece can be attracted to and attached to the first holding means, and thereupon transferred to a prescribed location. If the size of the corepiece is relatively large, the corepiece may be transferred from the machining position by a pallet changer, etc., while the first holding means maintains its position relative to the rest of the workpiece.

According to another aspect of the invention, the machining gap is flushed with machining fluid from the wire guide block via hollow portions of the first and second holding means, the first holding means and the second holding means being held coaxially whereby the first and second holding means comprise the discharge duct of the nozzle for supplying machining fluid to the working gap.

According to a further aspect of the invention, the first and second holding means may comprise electromagnets; the electromagnet of the first holding means being operable to load and freely remove the corepiece by exciting/demagnetizing the first holding means, whereby the corepiece handling can be performed rapidly and stably.

The first holding means may comprise a ring-shape permanent magnet having a coil. The coil may be magnetized and demagnetized by connecting it to and disconnecting it from a power source.

Also, as the second holding means, the vacuum attaching device may be used.

According to yet another aspect of the invention, the first holding means may comprise several holding means of different sizes corresponding to the size of the corepiece to be handled, and an exchange device may be installed for loading and removing the first holding means by selecting a desired holding means according to the size of the corepiece from among several holding means. Also, even when the corepiece is transferred in the state where it is maintained within the rest of the workpiece by the electromagnet, after attaching a new first holding means which corresponds in size to the next corepiece to be produced to the second holding means, operation can continue.

BRIEF DESCRIPTION OF THE DRAWINGS

FIGS. 5(A)–5(L) are vertical cross sections of the device of FIG. 2 illustrating progressive steps in its operation.

FIGS. 6(A)–6(C) are vertical cross sections of the general device of FIG. 2 illustrating another example of progressive steps in its operation.

FIGS. 8(A)–8(C) illustrate B–H characteristics of the lower electromagnet of the example of FIG. 7.

PRESENTLY PREFERRED EMBODIMENT OF THE INVENTION

Figure 1:
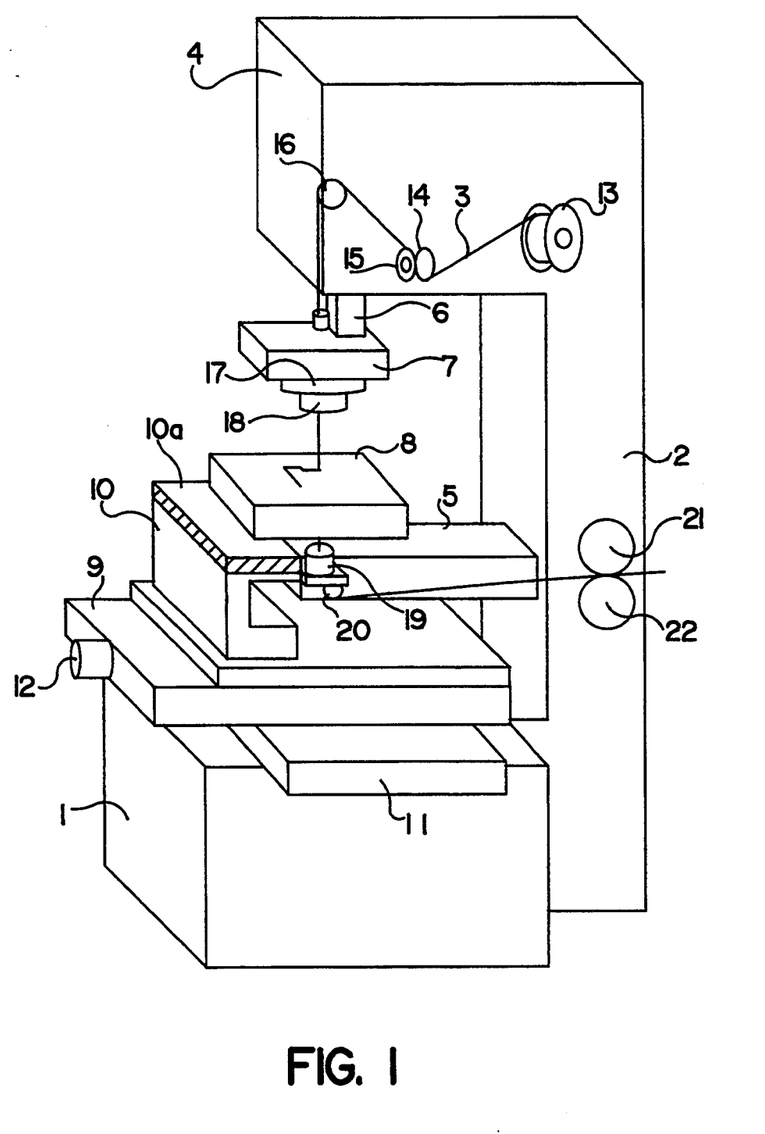
FIG. 1 shows a wire cut electro-discharge machining device equipped with an example of a corepiece handling device according to the invention.

FIG. 1 shows a wire cut electro-discharge machining device equipped with an example of a corepiece handling device according to the present invention. The column 2, in which the bed 1 is installed, supports an upper arm 4 and a lower arm 5 which in turn support the wire electrode 3. A head 6 is supported by the upper arm 4 so as to be able to move up and down. An upper wire guide block 7 is fixed to the lower part of the head 6.

The workpiece 8 is fixed at a preset position on the pallet 10a, which can be freely loaded and removed, on a mount 10 which is fixed to a table 9. The table 9 is supported by the bed 1, via the saddle 11 which moves in x-axis direction on the horizontal surface of the bed 1 under control of a numerical controller. The table 9 is moveable in the y-axis direction by means of the servomotor 12 driven by the numerical controller.

The wire electrode 3 is inserted between a pinch roller 14 and a brake roller 15 which perform a brake control for imparting a prescribed tension to the wire electrode 3 as it is unwound from the feeding drum 13, and directed through the workpiece 8 via a guide roller 16, a conductivity piece and upper position determining wire guide (not shown in FIG. 1), an upper wire guide block 7, a ring-shape upper electromagnet 17 fixed to the upper wire guide block 7, and a ring-shape lower electromagnet 18, which is removeably attached to the upper electromagnet 17. The used wire electrode 3 passed through the workpiece 8, drawn by the pinch roller 21 and the capstan roller 22 via a machining fluid supply nozzle 19, a lower position determining wire guide and lower conductivity piece (not shown in FIG. 1), and the guide roller 20, and is sent out to a waste device (not shown in FIG. 1).

Figure 2:
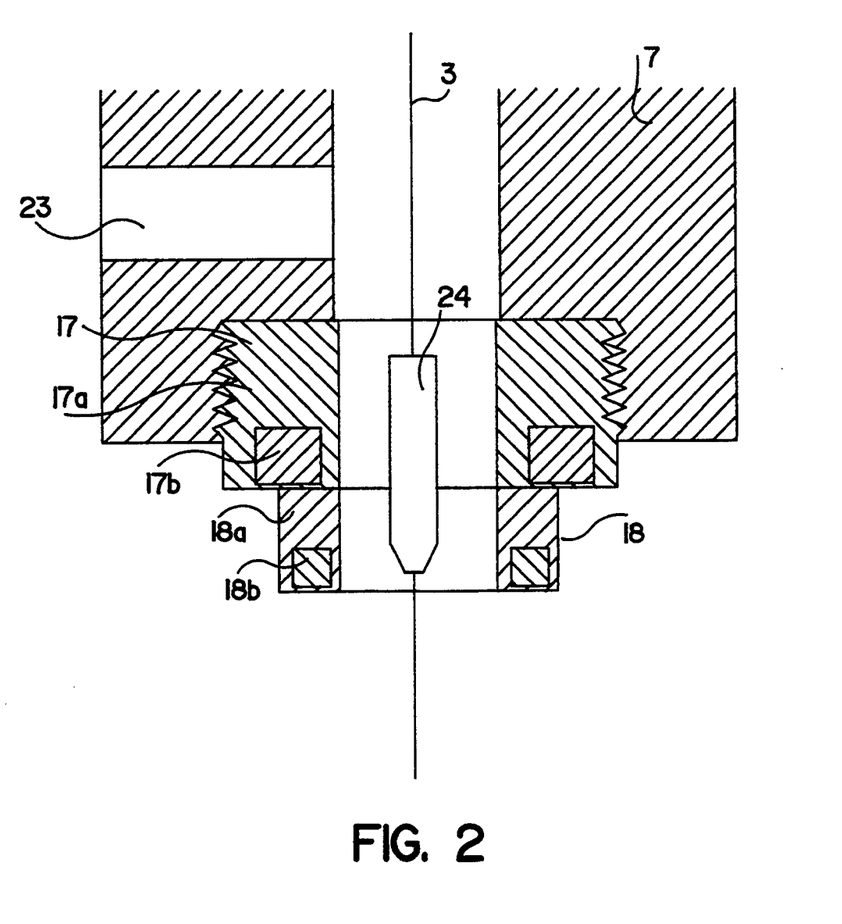
FIG. 2 is the vertical cross section illustrating the main components of a corepiece handling device according to the invention.

As shown in the vertical cross section of FIG. 2, the upper electromagnet 17 may, for example, be fixed by a screw fitting or other insertion or fixing device to the lower surface of the upper wire guide block 7. In the illustrated embodiment, it comprises a ring-shape magnetic material 17a and a coil 17b, wound about the lower periphery of the magnetic material 17a, for example, by imbedding it into a groove provided in the magnet material 17a. The upper position determining wire guide 24 for the wire electrode 3 is installed in the upper electromagnet 17 or the upper wire guide block 7.

Similarly, the lower electromagnet 18, may comprise a ring-shape magnetic material 18a and a coil 18 wound about the lower periphery of the magnetic material 17a, for example, by imbedding it into a groove in the magnetic material 18a. When excited, the lower magnet 18 is attached to the coil 17b of the upper electromagnet 17 and it forms a part of the upper nozzle which supplies machining fluid provided from the machining fluid supply duct 23 of the upper wire guide block 7. Also, when the coil 18b is excited, the lower electromagnet 18 may be attached to the workpiece 8, assuming it is composed of a magnetic material.

The lower electromagnet 18 of FIGS. 1 and 2 may be used for relatively small corepieces. Since the outer diameter of the lower electromagnet 18 may be in the range of 6–100 mm, as shown in FIG. 3, alternatives a, b, and c, the corepiece can usually be attached to the lower electromagnet 18, after exchanging it in accordance with the size of the corepiece so that small, medium and large size corepieces can be handled.

Figure 4:
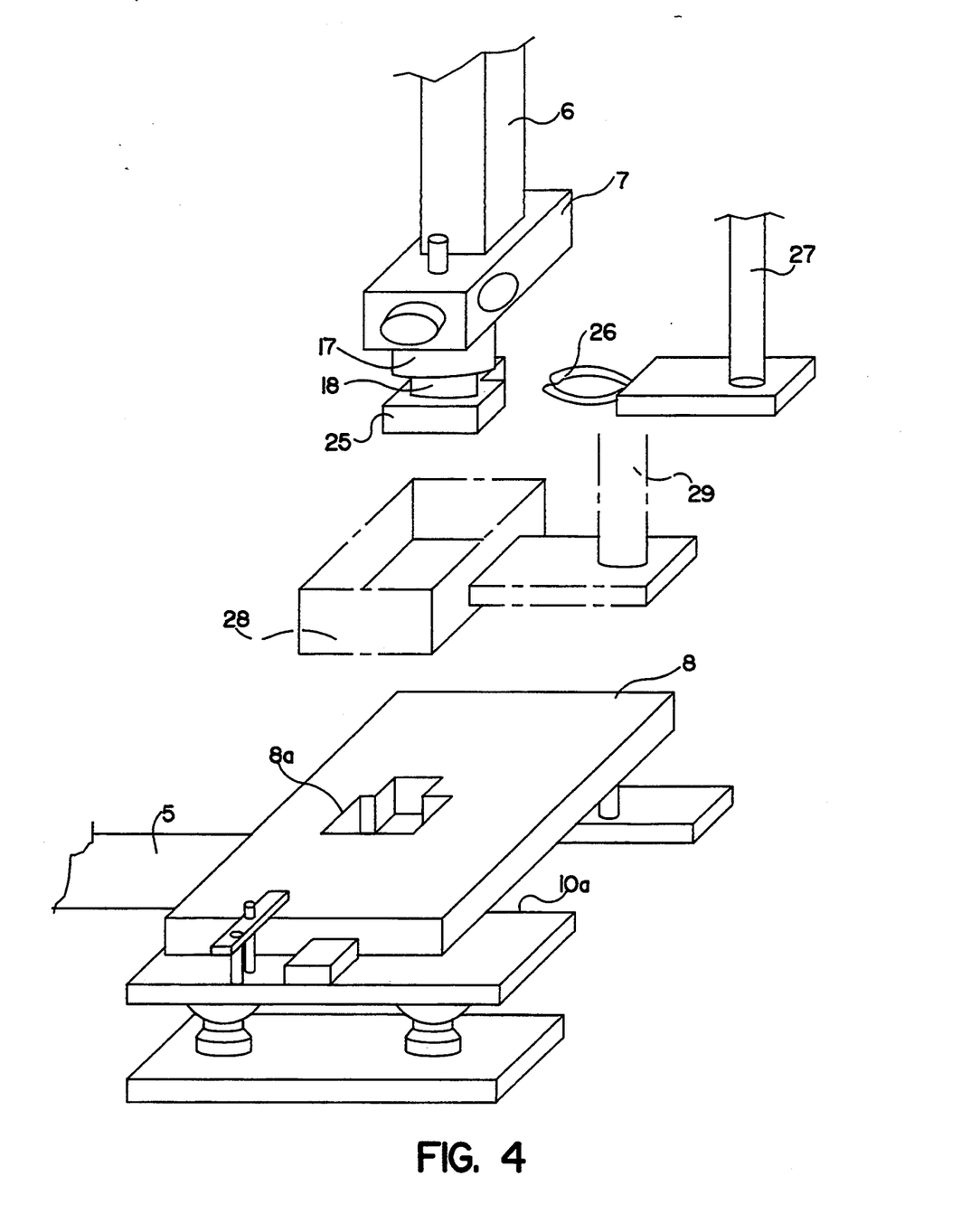
FIG. 4 illustrates another example of a corepiece handling device according to the invention.

FIG. 4 shows, in outline form, the transfer of a corepiece 25 (reference numeral 8a indicates the hole left when the corepiece 25 is removed from the workpiece, and reference numeral 8b indicates the remaining part of the workpiece) and the exchange device for the lower electromagnet 18. A multi-functional arm 27 having a "hand" 26 for exchanging the lower electromagnet 18 is driven in x, y and z directions by the numerical controller so that exchange of the lower electromagnet is possible. Also, a core treatment arm 29 having a recovery container 28, is moved to a prescribed position, by, for example, the machine operator, to receive the corepiece 25, which is dropped when the lower electromagnet 18 is demagnetized.

Figure 3:
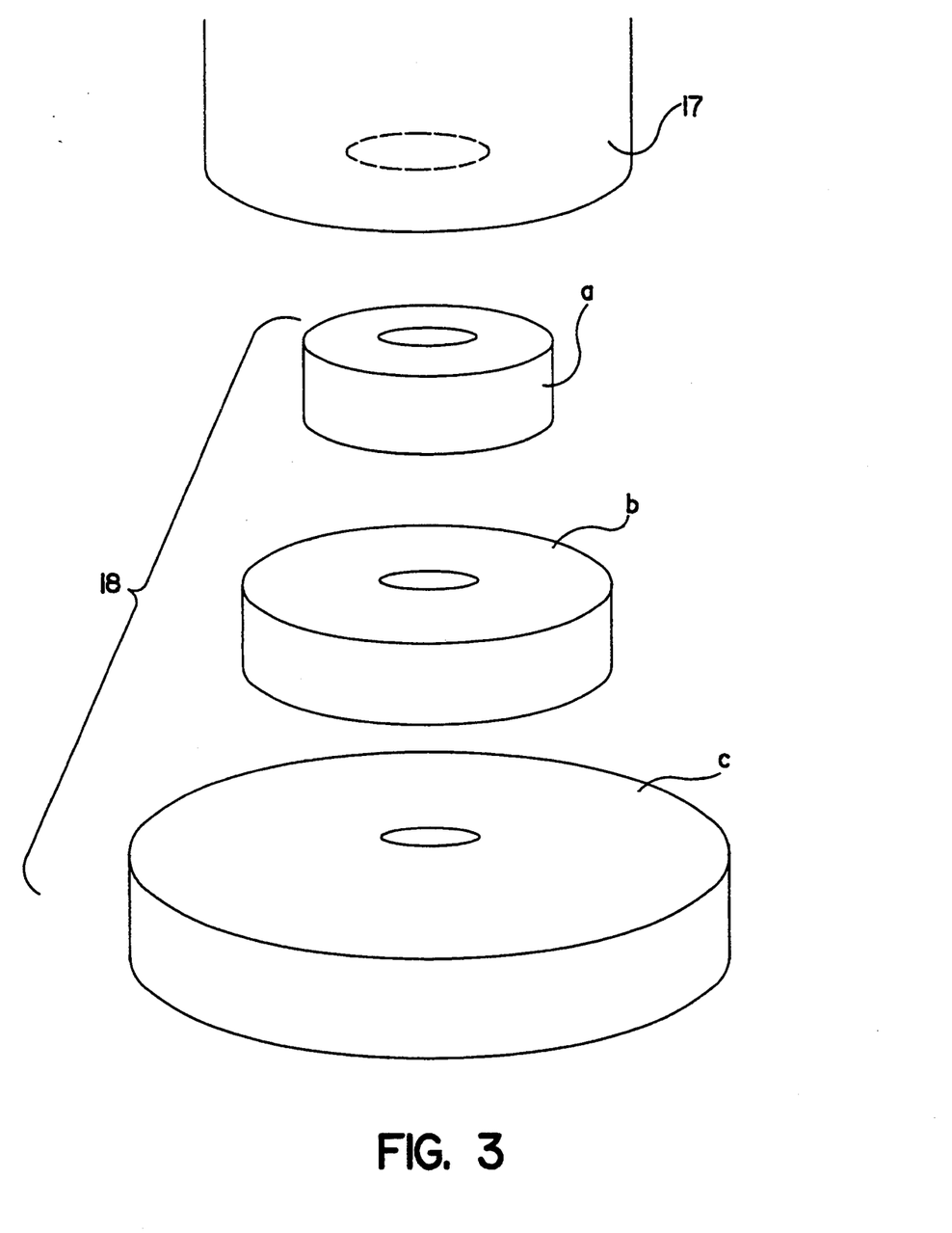
FIG. 3 illustrates various size corepiece holding devices.
Figure 5A:
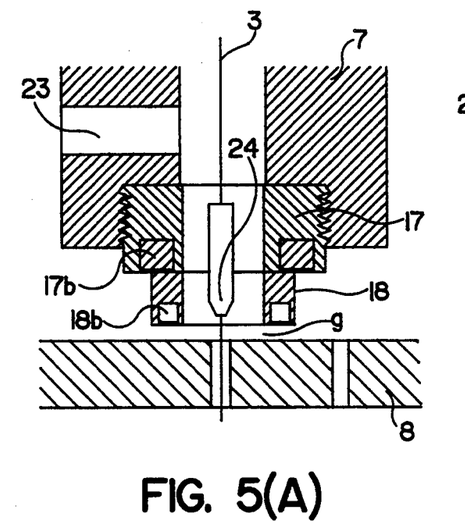

FIGS. 5(A)–5(L) illustrate a method of machining that includes handling of small and medium sized corepieces 25 using the core treatment device of the example of FIGS. 2–4. As shown in FIG. 5(A), during normal machining, i.e., after exciting the upper electromagnet 17 to thereby attach it to the lower electromagnet 18, a gap g is produced between the workpiece 8 and the lower electromagnet 18 by demagnetizing the lower electromagnet 18 (the slant lattice hatching of the coil 17b indicates an excited state, and the white spacing of the coil 18b indicates a demagnetized state), and machining is performed by moving the workpiece 8 relative to the wire electrode 3 in the x and y-directions by means of the numerical controller.

Figure 5B:
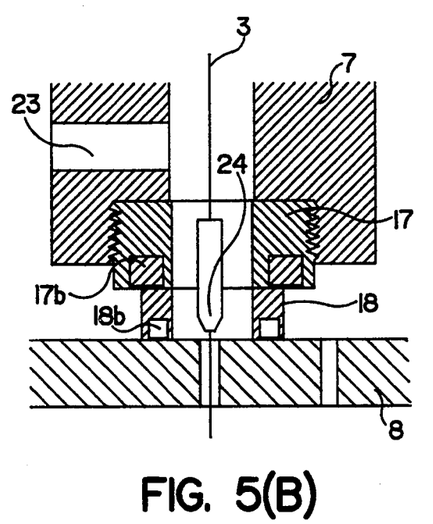

During normal machining, once machining progresses until the corepiece 25a is only slightly connected to the surrounding part 8b of the workpiece 8, as shown in FIG. 5(B), the head 6 and the upper wire guide block 7 are lowered until the lower electromagnet 18 contacts the workpiece 8.

Figure 5C:
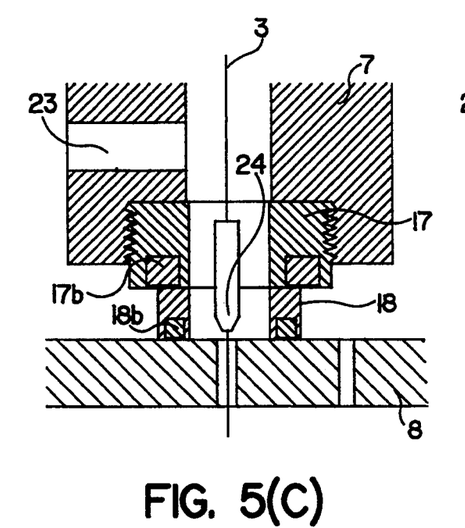
Figure 5D:
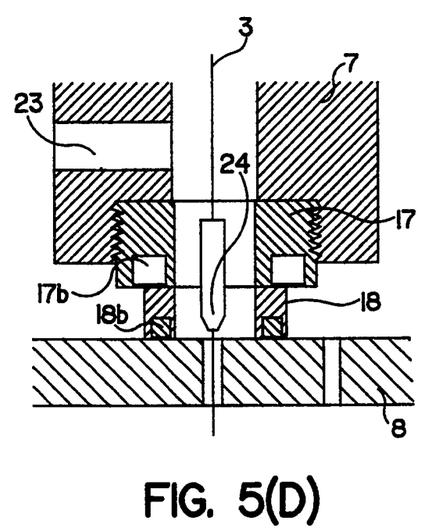
Figure 5E:
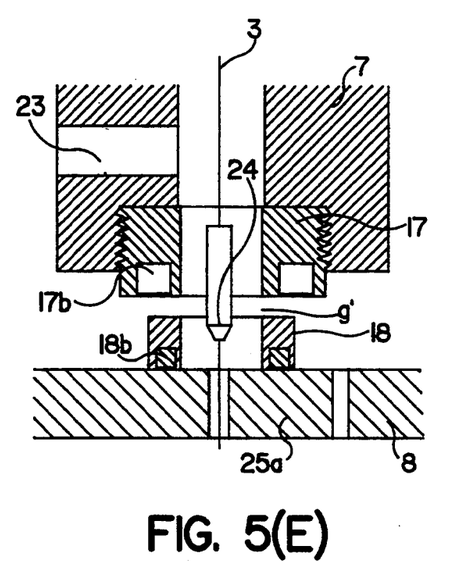

Then, as shown in FIG. 5(C), the lower electromagnet 18 is excited, i.e., magnetized, and the upper electromagnet 17, as shown in FIG. 5(D) is demagnetized so that the lower electromagnet 18 straddles the core part 25a and the surrounding part 8b of the workpiece 8. Next, the upper water supply block 7 is pulled up away from the workpiece by raising the head 6 as shown in FIG. 5(E), and the upper electromagnet 17 is displaced in the x- and y-direction relative to the lower electromagnet 18 thereby producing a gap g' between the upper electromagnet 17 and the lower electromagnet 18.

Figure 5F:
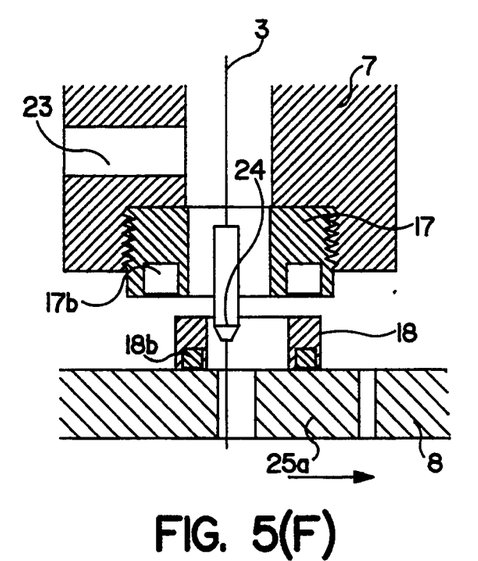
Figure 5G:
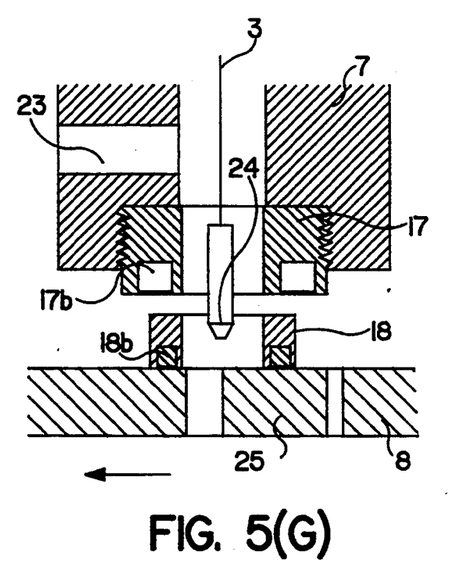

Next, as shown in FIG. 5(F), after machining of the contour in the workpiece 8 by moving it relative to the wire electrode 3 has been completed, the part of the workpiece 8 which connects the corepiece 25a to the workpiece 8 is cut through thereby producing the corepiece 25 (FIG. 5(G)), the lower electromagnet 18 straddles the corepiece 25 and the surrounding part of the workpiece 8. The corepiece, which is held by the lower electromagnet 18 does not drop away.

Figure 5H:
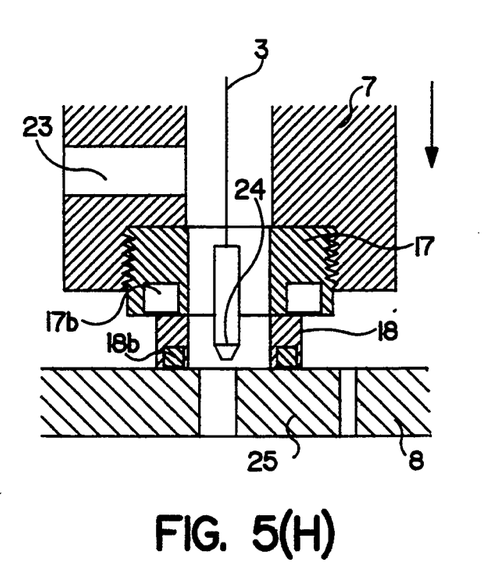
Figure 5I:
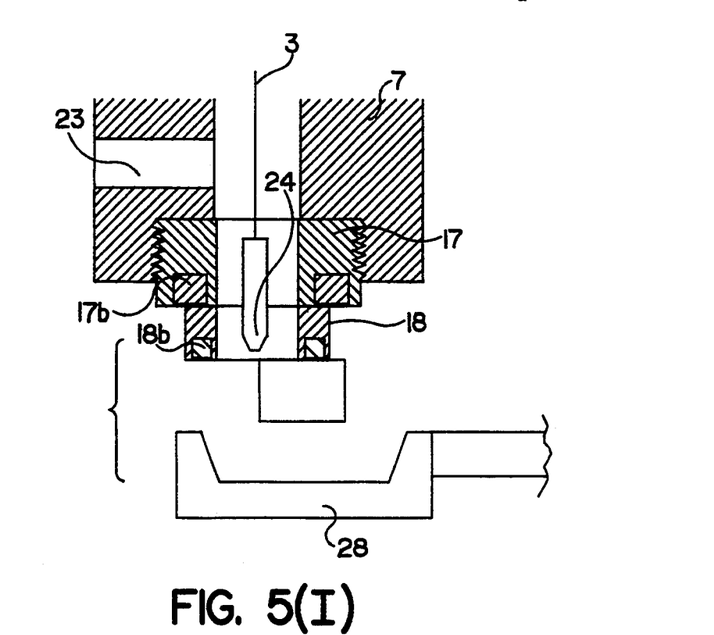
Figure 5J:
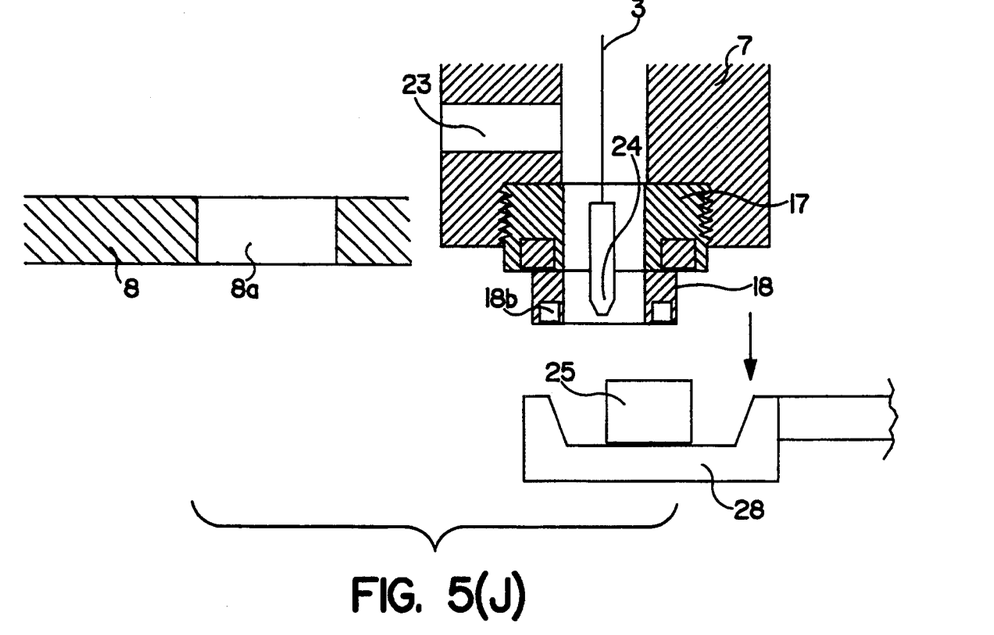

Next, as shown in FIG. 5(G), after returning the workpiece 8 to its starting point relative to the position of the wire electrode 3, the upper wire guide block 7 is lowered until the upper electromagnet 17 contacts with the lower electromagnet 18 as shown in FIG. 5(H). The lower electromagnet 18 is then attracted and attached to the upper electromagnet 17 by exciting the upper electromagnet 17 as shown in FIG. 5(I). Then the corepiece 25, held by the lower electromagnet 18, is removed by raising the head 6 and pulling up the upper wire guide block 7 as shown in FIG. 5(J). The corepiece 25 is then removed from the surrounding part of the workpiece 8 with the lower electromagnet 18 being held by the upper electromagnet 17.

Next, as shown in FIG. 5(I), after positioning the recovery container 28 between the corepiece 25 and the workpiece 8, the corepiece 25 is removed from the lower electromagnet 18 by demagnetizing the lower electromagnet 18, as shown in FIG. 5(J), and held in the recovery container 28. Then, by moving the core treatment arm 28, the corepiece is recovered by moving the recovery container 28 to a position where recovery is possible.

Figure 5K:
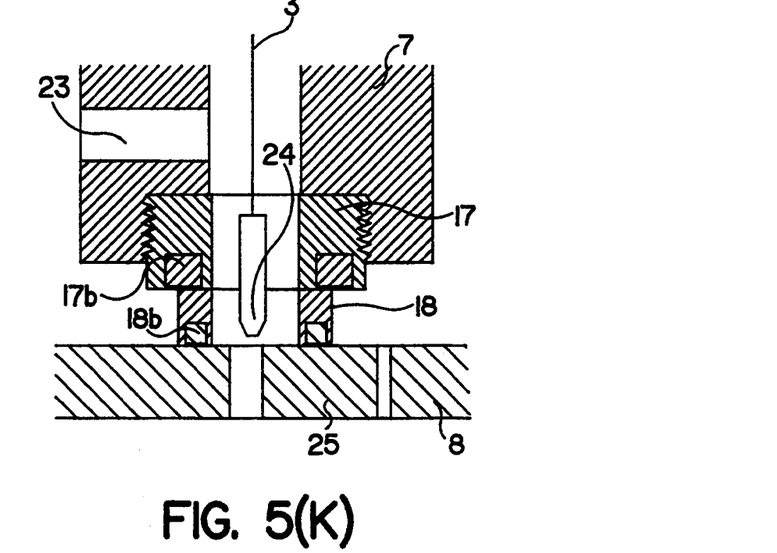
Figure 5L:
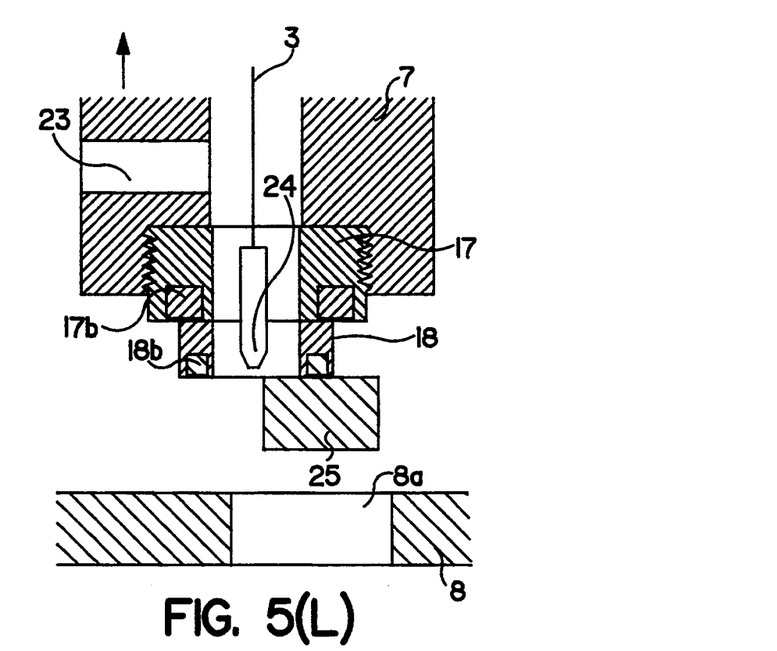

The procedure discussed above applies in cases where the corepiece size varies from relatively small to medium-sized. In cases where the size of the corepiece 25 is relatively large, then as shown in FIG. 5(K), after cutting out the corepiece 25 and raising the upper wire guide block 7 as shown in FIG. 5(L), the mount 10 or the pallet 10a may be removed by special means, other than the upper wire guide block. For example, specially installed robot hands or various semi-automatic means may be used to move the pallet, while the corepiece 25 remains fixed by means of the lower electromagnet 18. The bonding between the corepiece 25 and the surrounding part of the workpiece may be relieved by demagnetizing the lower electromagnet 18 at the special treatment position. Then, the corepiece or workpiece may be transferred to the next machining procedure and a new lower electromagnet 18 attached to the upper electromagnet 17.

Figure 6A:
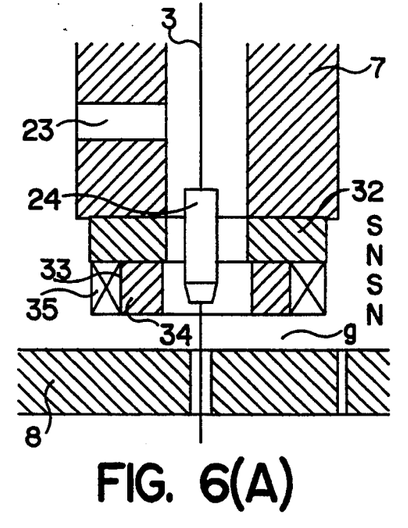

FIG. 6 is another example of the present invention, wherein the coil treatment, coil excitation, and demagnetization control associated with electromagnets are made unnecessary by fixing a ring-shape permanent magnet 32, which is a ferromagnetic material such as Sm-Co system, instead of the upper electromagnet 17, to the upper wire guide block 7. Also, in the lower electromagnet 33, a coil 35 is so wound as to surround the core 34, which comprises a ring-shaped magnetic material of ferrite, etc. During normal machining, as shown in FIG. 6(A), the core 34 may be magnetically attached to the permanent magnet 34 without exciting the coil 35, or the coil 35 may be excited in the forward direction relative to the permanent magnet 32. In either case, the lower electromagnet 33 is held by the permanent magnet 32, and machining is performed with a gap g formed between the lower electromagnet 33 and the workpiece 8.

Figure 6B:
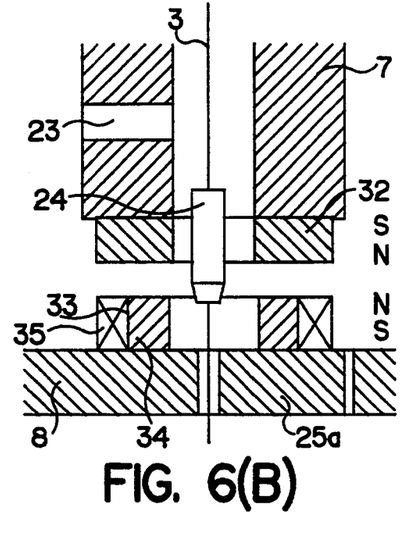

Then, when the corepiece 25a is cut out, as shown in FIG. 6(B), the direction of excitation of the core 34 is reversed by reversing the direction of current flow to the coil 35 of the lower electromagnet 33, therein separating the lower electromagnet 33 from the permanent magnet 32, and lowering it to the surface of the workpiece 8, where the lower electromagnet 33 is positioned as to straddle the corepiece 25a and the surrounding part of the workpiece 8. Thereby the corepiece 25a is cut out while the part which becomes the core 25 of the workpiece 8, is fixed the lower electromagnet 33 as explained above in connection with FIG. 5.

Figure 6C:
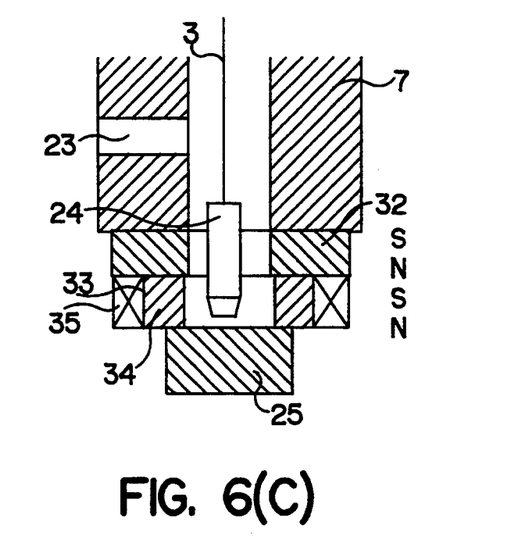

After completing the contour machining and the lower electro-magnet 33 contacts the corepiece 25, the upper wire guide block 7 is lowered, as shown in FIG. 6(C) and the lower electromagnet 33 is reattached to the permanent magnet 32 by changing the direction of current flow to the coil 35 to excite the coil in the forward direction, whereupon the corepiece 25 may be drawn out of the workpiece 8 by raising the upper wire guide block 7.

Thus, by using the permanent magnet 32, corepiece handling is simplified.

Figure 7A:
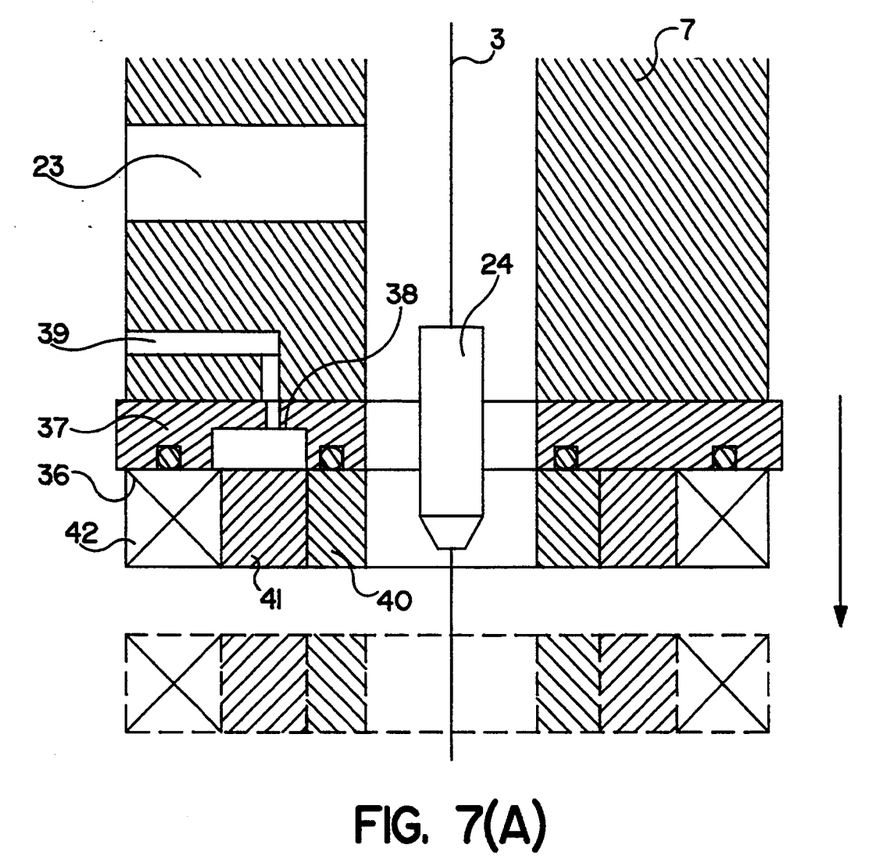
FIG. 7(A) is a vertical cross section which shows another example of the invention.
Figure 7B:
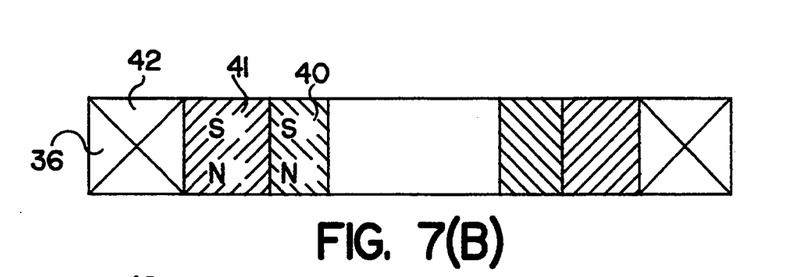
FIGS. 7(B) and 7(C) are the cross sections which show the lower electromagnet of FIG. 7(A) in its attached and non-attached states respectively.
Figure 7C:
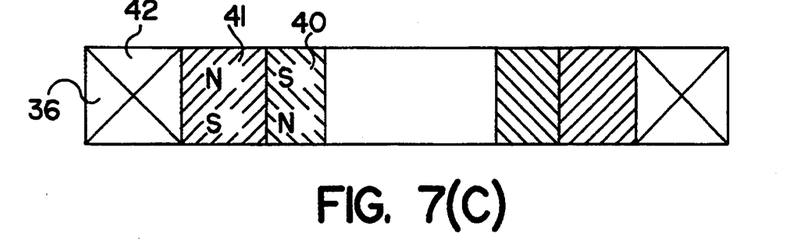

FIGS. 7(A) to 7(C) illustrate another embodiment in which a vacuum attachment method is used to attach a lower electromagnet 36 to the upper wire guide block 7. A circular concave part 38 is formed in a ring-shaped block 37 which is fixed to the lower surface of the upper wire guide block 7. The concave part 38 is connected, via a hose connect duct 39 formed in the upper wire guide block 7, to a source of vacuum. The lower surface of the block 37 contacts the upper surface of the lower electromagnet 36 when attaching the lower electromagnet 36 to the block 37 by discharging the air (i.e., applying a vacuum) to the concave part 38 via a hose (not shown in the Figure) and the hose connect duct 39 by means of, e.g., a vacuum pump. To disconnect the lower electromagnet 36 from the block 37, as shown in the two-point dotted line of FIG. 7(A), the vacuum on the concave part 38 is relieved by, for example, a valve (which is not shown in the Figure).

Figure 8A:
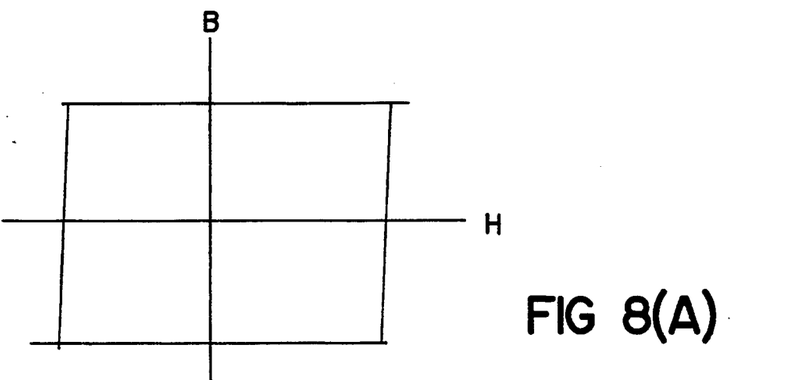
Figure 8B:
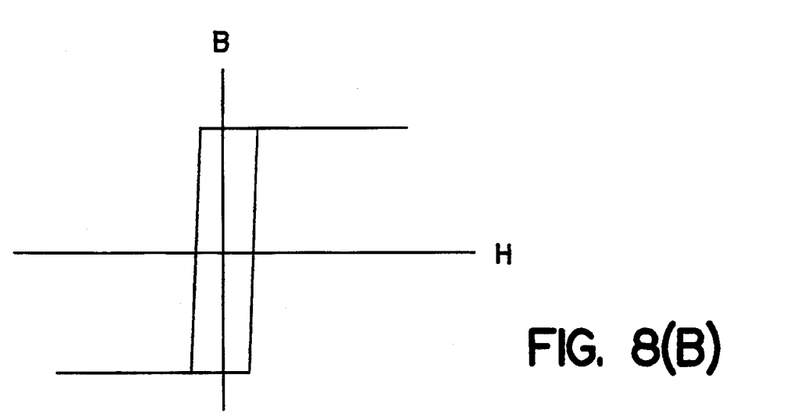
Figure 8C:
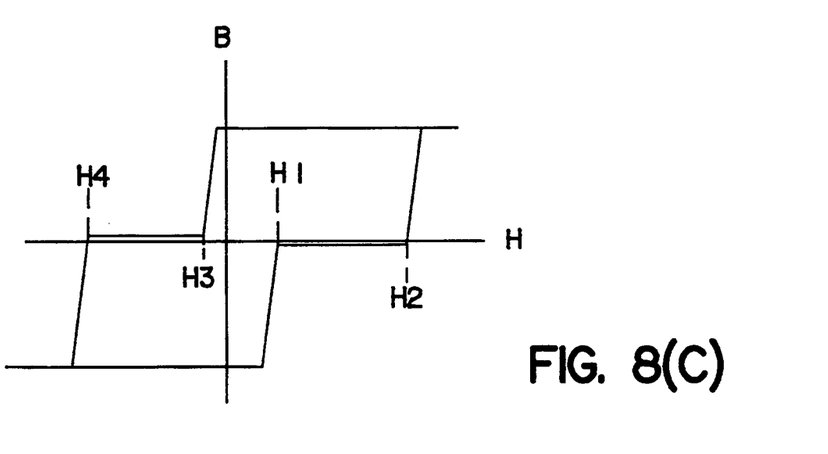

In the example of FIG. 7, the lower electromagnet 36, or the lower electromagnets 18 and 33 shown in the example of FIGS. 5 and 6 may be used. However, in the example of FIG. 7, a relatively hard magnetic ferrite 41 (having a B-H characteristic such as illustrated in FIG. 8(B)) is bonded to the outside of the permanent magnet 40 (having a B-H characteristic such as illustrated in FIG. 8(A)) which may comprise a ferromagnetic material such as a Sm-Co system, and the coil 42 is wound about its periphery, thus achieving the B-H characteristic of FIG. 8(C) to the combination.

In lower electromagnet 36, as shown in FIG. 7(B), the ferrite 41 is magnetized in the same direction as the permanent magnet 40, and it can hold the workpiece 8. As shown in FIG. 7(C), by magnetizing the ferrite in the reverse direction to the permanent magnet 40, it will not hold the whole workpiece.

According to this example of the invention, it is not always necessary to use an exiting current for the lower electromagnet 36. After a demagnetizing current flow through the coil 42, when again magnetizing the coil 42, as shown in FIGS. 7(B) or 7(C) by changing the magnetizing direction of the ferrite 41, a current corresponding to the range of the magnetic field H1-H2 or H3-H4 of FIG. 8(C) may be used, since the electromagnet 36 is demagnetized as a whole. The current setting need only be approximate.

The electromagnet 36 can also be used as an upper electromagnet in the embodiments discussed above.

Figures 9A, 9B:
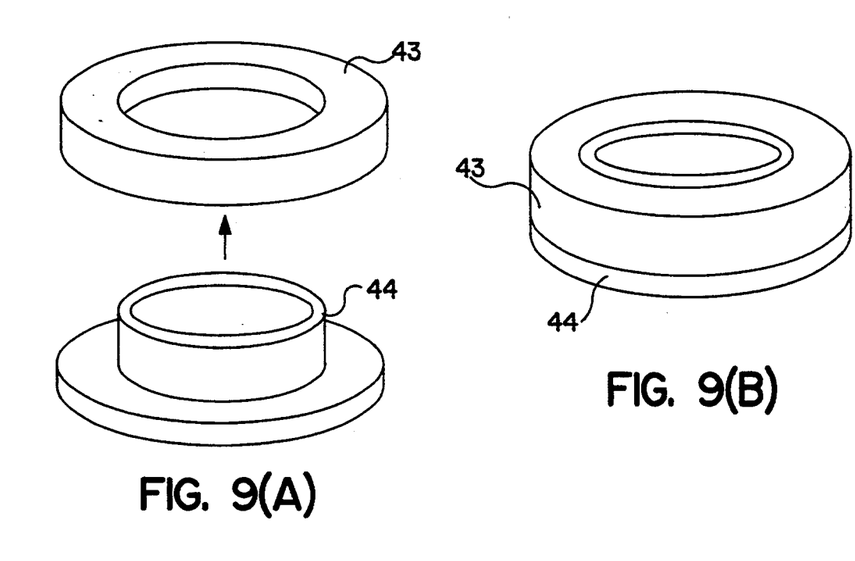
FIGS. 9(A) and FIG. 9(B) are exploded and unexploded views respectively of an alternative embodiment of the lower magnet.
Figure 9C:
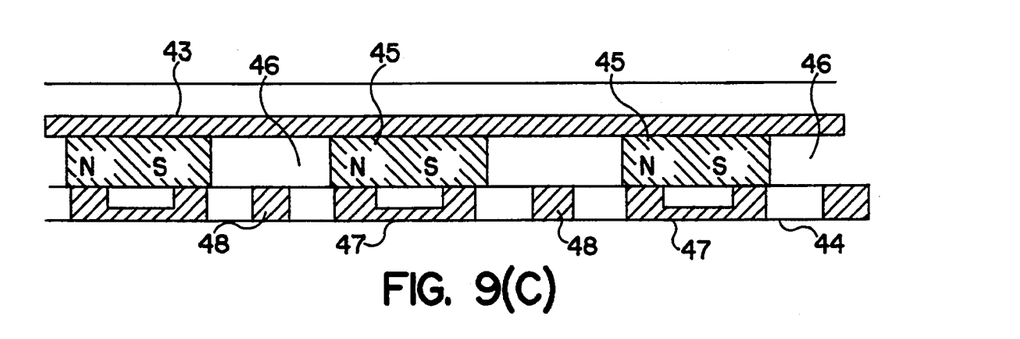
FIGS. 9(C) and 9(D) are cross sections which show the non-attached and the attached state of the magnets of FIG. 9(A).
Figure 9D:
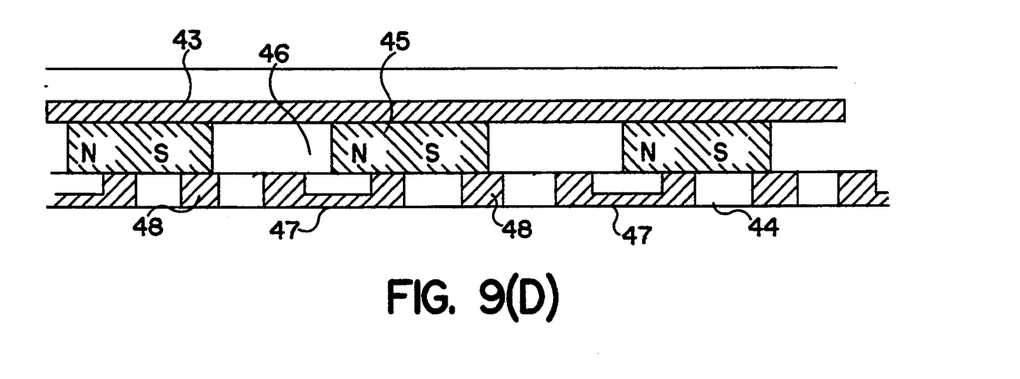

FIG. 9 depicts an example of a magnet which can be used instead of the lower electromagnet of the prior embodiments. The upper ring 43 and the lower ring 44, which, as shown in FIG. 9(A) have approximately the same diameter, are combined as shown in FIG. 9(B) so that each can be freely rotated relative to the other, and the fitting cannot be opened by the peripheral ring (not shown in the Figure). A permanent magnet 45, magnetized in the peripheral direction, and the nonmagnetic materials 46 are installed at generally equal circumferential intervals in the upper ring 43 as shown in FIGS. 9(C) and 9(D). A magnetic material 47 having the same width in circumferential direction as the permanent magnet 45, and having an upward U-shaped cross section, and magnetic material 48 of a generally square cross section and positioned between the permanent magnets 43 are installed in the lower ring 44. A closed magnetic circuit is formed by positioning of the permanent magnet 45 and the U shape magnetic material 47, as shown in FIG. 9(C). In this state, the magnetic attraction is decreased (unexcited state as a whole). As shown in FIG. 9(D), by shifting the position of the permanent magnet 45 and the U shape magnetic material 47, by the relative rotation between the upper ring 43 and the lower ring 44, the magnetic circuit is opened, and the workpiece 8, which is composed of a magnetic material, can be held between the magnetic materials 47 and 48. It is not necessary to use a structure, such as the relative rotation means between the upper rings 43 and 44 to achieve the benefits of this embodiment. It may also be effective to use this embodiment in situations where the magnets are adversely influenced (electrically) by the wire electrode.

This invention is not limited to the examples of application mentioned above, but can be variously modified.

For example, the semi-hard or hard magnetic material used as the magnetic material 18a of the electromagnets 18 and 34, may be permanently magnetized by magnetizing and exciting the respective coils when holding the workpiece 8. In order to demagnetize and release the workpiece, the magnets can be demagnetized by the reverse excitation and demagnetization.

In FIG. 3, as the first holding means, i.e., the lower electromagnet 18, is illustrated as corresponding to the size of the core. However, the electromagnet is not limited to the hollow column shape but can be any shape which can effectively attract and hold the corepiece and the surrounding part of the workpiece.

Also, as shown in FIG. 5(B), in order for the lower electromagnet 18 to contact the workpiece 18, the upper wire guide block 7 is lowered. However, in cases where the gap g is narrow, the upper electromagnet 17 can simply be demagnetized without lowering the upper wire guide block 7. Since one cannot interrupt machining without adversely influencing the machining precision, especially taper machining, precision will be preserved by not having to lower the guide block.

According to this invention, since the lower electromagnet for handling corepieces of different sizes can be exchanged in accordance with the size of the corepiece, the efficiency of the wire cut electro-discharge method as practice when producing various size corepieces is improved, and automation and unmanned machining can be achieved.

I claim:

1. A wire-cut electroerosion machine for contour machining a workpiece using a wire electrode, said wire electrode being tensioned between a first wire guide block and a wire guide as it passes through a working zone of said electroerosion machine, wherein said contour machining produces a corepiece from said workpiece, said electroerosion machine further including a corepiece handling apparatus comprising:

a first holding means positioned adjacent the workpiece, and comprising a magnetic material which can be selectively magnetized or demagnetized;

a second holding means fixed to said wire guide block for holding said first holding means; and means for detaching said first holding means from said second holding means and for attaching said first holding means to a workpiece to thereby maintain the position of said corepiece relative to said workpiece while said corepiece is cut from said workpiece during said contour machining.

2. The electroerosion machine of claim 1 wherein said first holding means is attached coaxially with said second holding means and wherein said first and second holding means include passages for permitting passage of said electrode therethrough, and wherein machining fluid is introduced to the working zone through said passages.

3. The electroerosion machine of claim 2 wherein the passages in said first and second holding means are axially aligned and form a nozzle for introducing machining fluid to the working zone.

4. The electroerosion machine of claim 1 wherein said first and second holding means are disk-shaped and each includes a passage therethrough, said passages, when axially aligned, forming a nozzle for introducing machining fluid to the working zone.

5. The electroerosion machine of claim 1 wherein said first and second holding means are electromagnets and said second holding means includes a coil, wherein said coil of said second holding means is operable to be energized to magnetize and attach said first holding means to said second holding means and to be de-energized to demagnetize and detach said first holding means from said second holding means.

6. The electroerosion machine of claim 1 wherein said first holding means comprises a ring-shaped permanent magnet having a coil wound around its periphery for effectively disabling said first holding means.

7. The electroerosion machine of claim 1 wherein said second holding means includes a vacuum apparatus operable, when said vacuum is actuated, to attach said first holding means to said second holding means and when said vacuum is deactivated to detach said first holding means from said second holding means.

8. The electroerosion machine of claim 1 wherein said second holding means comprises a first annular member having a series of spaced-apart permanent magnets with the spaces between said permanent magnets being at least partially-filled with a non-magnetic material;

said first holding means comprises a second annular member having a series of spaced-apart permanent magnets positioned along its periphery and a series of spaced-apart magnetic material inserts positioned between said permanent magnets;

whereby the spaced-apart magnets in said first and second holding means are positioned to form a magnetic open circuit for magnetically attaching said first holding means to said corepiece when each of said permanent magnets in said first annular member is positioned adjacent to both a portion of one of said permanent magnets in said second annular member and a portion of one of said permanent magnet inserts, and to form a magnetic closed circuit, for magnetically detaching said first holding means from said corepiece when each of said permanent magnets in said first annular member is vertically aligned with one of said permanent magnets in said second annular member.

9. The corepiece handling apparatus of claim 1 wherein said first holding means is selected from a plurality of holding means which vary in size according to the size of the corepiece formed and said core handling apparatus further comprises an exchanger for removing the first holding means and installing a different first holding means appropriate to the size of the corepiece to be formed.

10. A method of handling a corepiece cut from a workpiece using a wire-cut electroerosion machine having a wire guide block comprising a guide member for guiding a wire electrode as it passes through a working zone of said machine, said method comprising the steps of:

attaching a first holding means to said wire guide block;

attaching a second holding means, comprising a magnetic material for selectively magnetizing said first holding means, to said first holding means;

machining a contour in a workpiece by electroerosion;

detaching said second holding means from said first holding means and positioning said second holding means to straddle said workpiece and said corepiece; and resuming said machining of said workpiece until said corepiece is cut from said workpiece;

whereby said second holding means holds said corepiece in a stable position relative to said workpiece when said corepiece is cut free from said workpiece.

11. The corepiece handling method of claim 10 further comprising the step of removing said corepiece from said workpiece by raising said second holding means relative to said workpiece.

12. The corepiece handling method of claim 10 wherein:

each of said first holding means and said second holding means are comprised of electromagnets and wherein each of said first holding means and said second holding means include a coil for energizing said electromagnets; and wherein said step of attaching said second holding means to said first holding means further includes the step of energizing the coil of said first holding means; and said steps of detaching said second holding means from said first holding means and attaching said second holding means to said corepiece and workpiece further comprises the steps of de-energizing the coil of said first holding means and energizing the coil of said second holding means.

13. The corepiece handling method of claim 10 wherein:

said first holding means comprises a permanent magnet and said second holding means comprises a coil wound around a permanent magnet;

said step of detaching said second holding means from said first holding means comprises the step of creating a current in said coil for generating a magnetic field opposite to that created by said permanent magnet.

14. The corepiece handling method of claim 10 wherein:

said step of attaching said second holding means to said first holding means further includes the step of creating a vacuum; and said steps of detaching said second holding means from said first holding means and attaching said second holding means to said corepiece and workpiece further comprises the steps of removing said vacuum and energizing a coil of said second holding means.

15. The corepiece handling method of claim 10, wherein said step of attaching said second holding means further comprises the steps of:

removing an existing second holding means from said first holding means;

selecting an optimal second holding means in accordance with a size of the corepiece to be formed; and placing said optimal second holding means onto said first holding means.

* * * * *